(12) United States Patent
Lee

(10) Patent No.: US 10,451,856 B2
(45) Date of Patent: Oct. 22, 2019

(54) ZOOM LENS SYSTEM

(71) Applicant: HANWHA TECHWIN CO., LTD., Seongnam-si (KR)

(72) Inventor: Sang Hyuck Lee, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 50 days.

(21) Appl. No.: 15/448,903

(22) Filed: Mar. 3, 2017

(65) Prior Publication Data
US 2017/0343780 A1    Nov. 30, 2017

(30) Foreign Application Priority Data

May 26, 2016  (KR) .......................... 10-2016-0064933

(51) Int. Cl.
*G02B 15/173* (2006.01)
*G02B 13/14* (2006.01)

(52) U.S. Cl.
CPC ......... *G02B 15/173* (2013.01); *G02B 13/146* (2013.01)

(58) Field of Classification Search
CPC ........ C03C 4/10; G02B 13/14; G02B 19/009; G02B 5/208; G02B 13/009; G02B 15/15; G02B 15/173; G02B 15/22; G02B 15/28; G02B 13/04; G02B 13/0045; G02B 9/64; G02B 13/005; G02B 13/146
USPC ....... 359/680, 681, 682, 683, 750, 751, 752, 359/754, 755, 756, 757, 350, 355, 356, 359/357
See application file for complete search history.

(56) References Cited

U.S. PATENT DOCUMENTS 7,626,767 B2    12/2009  Kudo
2004/0184160 A1*  9/2004  Nishina ................ G02B 15/173
                                                      359/690

(Continued)

FOREIGN PATENT DOCUMENTS

JP          2005-345714 A    12/2005
JP          2015-184644 A    10/2015
KR     10-2015-0146058 A    12/2015

OTHER PUBLICATIONS

Communication dated Oct. 20, 2017, issued by the European Patent Office in counterpart European Patent Application No. 17172609.4.

*Primary Examiner* — Evan P Dzierzynski
*Assistant Examiner* — Alberto J Betancourt
(74) *Attorney, Agent, or Firm* — Sughrue Mion, PLLC

(57) ABSTRACT

A zoom lens system includes: a first lens group having a positive refractive power; a second lens group having a negative refractive power; a third lens group having a positive refractive power; a fourth lens group having a positive refractive power; a fifth lens group having a positive refractive power; and a sixth lens group having a positive refractive power, wherein the first to sixth lens groups are sequentially arranged along an optical axis from an object side to an image plane side, and zooming is performed by moving at least one of the second lens group, the fourth lens group and the fifth lens group along the optical axis. A distance between a focal point of light having a first wavelength and a focal point of light having a second wavelength is about 50 μm or less at a wide-angle position and a telephoto position. The first wavelength corresponds to green light, the second wavelength corresponds to near infrared (NIR) light.

16 Claims, 7 Drawing Sheets

(56) References Cited

U.S. PATENT DOCUMENTS

| | | | | |
|---|---|---|---|---|
| 2005/0168832 A1* | 8/2005 | Hamano | ............. | G02B 15/173 |
| | | | | 359/687 |
| 2009/0040621 A1* | 2/2009 | Kudo | .................. | G02B 15/173 |
| | | | | 359/683 |
| 2011/0102906 A1 | 5/2011 | Oe | | |
| 2011/0134266 A1* | 6/2011 | Mihara | ................. | G02B 13/18 |
| | | | | 359/708 |
| 2012/0105683 A1* | 5/2012 | Yoshinaga | ........... | G02B 15/173 |
| | | | | 348/240.3 |
| 2014/0204252 A1* | 7/2014 | Yoshimi | .............. | G02B 15/173 |
| | | | | 348/294 |
| 2015/0316754 A1* | 11/2015 | Sanjo | ................... | H04N 5/2259 |
| | | | | 348/340 |
| 2015/0370052 A1* | 12/2015 | Abe | .................... | G02B 15/173 |
| | | | | 359/683 |
| 2016/0054550 A1* | 2/2016 | Bito | .................... | G02B 15/173 |
| | | | | 359/683 |
| 2016/0202453 A1* | 7/2016 | Iwasawa | ................ | G02B 13/18 |
| | | | | 359/683 |
| 2016/0238824 A1* | 8/2016 | Arai | ...................... | G02B 13/18 |
| 2017/0293118 A1* | 10/2017 | Huang | .................. | G02B 5/208 |

* cited by examiner

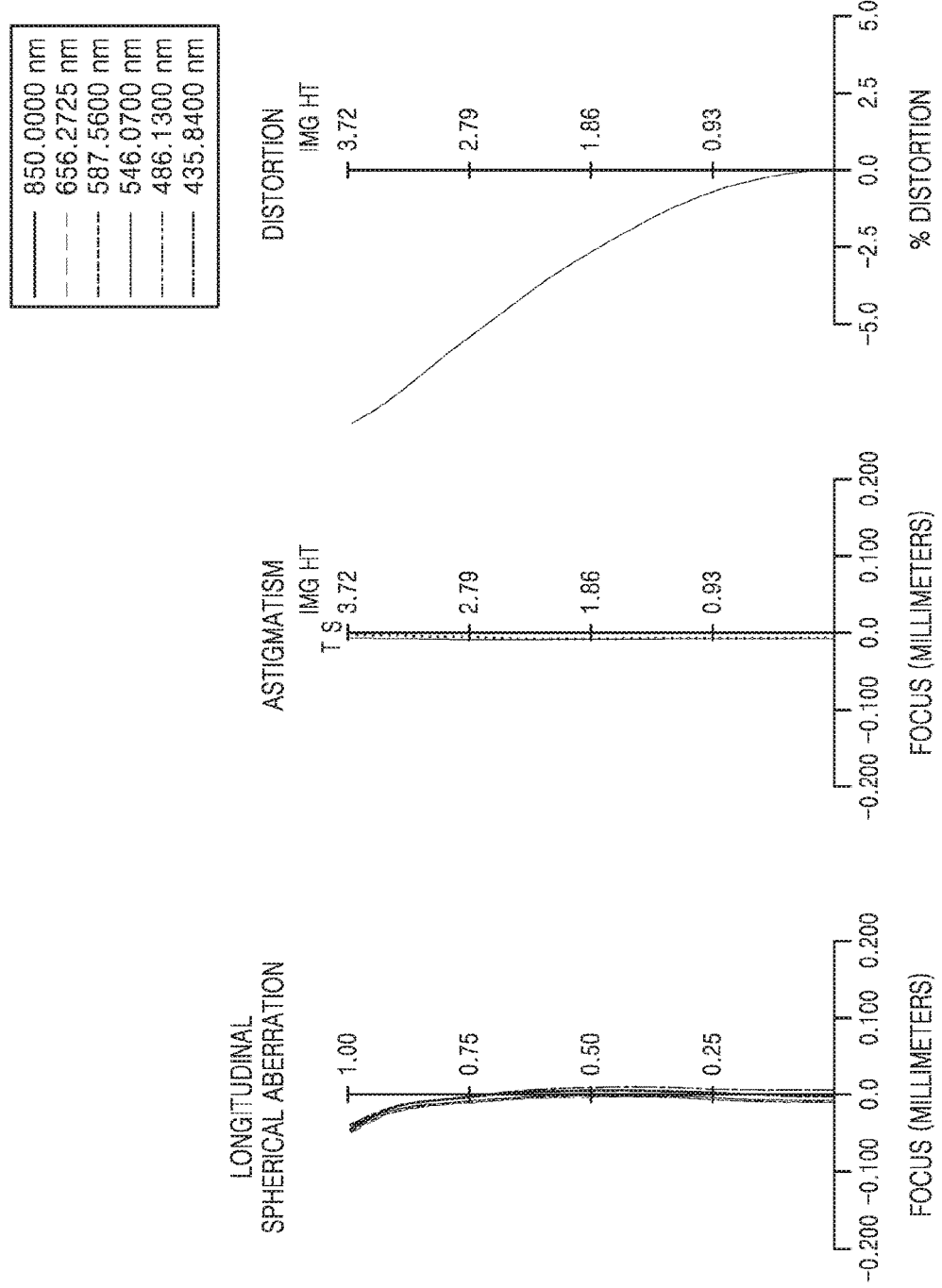

ZOOM LENS SYSTEM

CROSS-REFERENCE TO THE RELATED APPLICATION

This application claims priority from Korean Patent Application No. 10-2016-0064933, filed on May 26, 2016, in the Korean Intellectual Property Office, the disclosure of which is incorporated herein in its entirety by reference.

BACKGROUND

1. Field

Apparatuses consistent with exemplary embodiments relate to a zoom lens system, and more particularly, to a six-group zoom lens system.

2. Description of the Related Art

Recently, photographing apparatuses such as digital cameras, video cameras, or surveillance cameras are required to have small sizes.

However, imaging devices such as charge coupled devices (CCDs) or complementary metal-oxide semiconductors (CMOSs) included in photographing apparatuses are required to have large areas and many pixels for high pixel count. Thus, optical systems for directing image-forming light to imaging devices have large sizes, and thus, it is difficult to reduce an optical aberration over the entire region of the imaging devices. Therefore, there has been an increasing demand for a high-performance zoom lens system for use in small photographing apparatuses and capable of directing image-forming light to imaging devices with low optical aberration.

In addition, along with the increased importance of security, many individuals as well as public institutions or companies now use precise measurement cameras or surveillance cameras for closed-circuit televisions (CCTVs). Surveillance cameras are used at night as well as in the daytime, and thus, there has been an increasing need for surveillance camera zoom lens systems capable of effectively correcting aberration in a range from visible light to near infrared light.

SUMMARY

Various aspects of exemplary embodiments of the inventive concept will be set forth in part in the description which follows and, in part, will be apparent from the description, or may be learned by practice of the presented exemplary embodiments.

According to one or more embodiments, there is provided a zoom lens system which may include: a first lens group having a positive refractive power; a second lens group having a negative refractive power; a third lens group having a positive refractive power; a fourth lens group having a positive refractive power; a fifth lens group having a positive refractive power; and a sixth lens group having a positive refractive power, wherein the first to sixth lens groups are sequentially arranged along an optical axis from an object side to an image plane side, zooming is performed by moving the second lens group, the fourth lens group and the fifth lens group along the optical axis, and a distance between a focal point of light having a first wavelength and a focal point of light having a second wavelength is about 50 µm or less at a wide-angle position and a telephoto position. Here, the distance may be measured in a direction parallel to the optical axis The first wavelength may correspond to green light, the second wavelength may correspond to near infrared (NIR) light.

The first wavelength may be about 546 nm, and the second wavelength may be about 850 nm.

The distance between the focal point of light having the first wavelength and the focal point of light having the second wavelength may be about 30 µm or less at the wide-angle position.

The zoom lens system may satisfy a following condition:

$$15 < \frac{f_t}{f_w} < 30,$$

where $f_w$ is a focal length at the wide-angle position, and $f_t$ is a focal length at the telephoto position.

The zoom lens system may satisfy a following condition:

$$\frac{TL}{f_t/f_w} < 8,$$

where TL is a distance between an image plane to an object-side surface of one of lenses of the first lens group that is closest to the object side.

The zoom lens system may further include an aperture stop between the third lens group and the fourth lens group.

The first lens group, the third lens group, and the sixth lens group may be fixed during zooming.

The zoom lens system may satisfy a following condition:

$$2.5 < \frac{f_1}{f_4} < 3.0,$$

where $f_1$ is a focal length of the first lens group, and $f_4$ is a focal length of the fourth lens group.

The first lens group may include a doublet lens at a position closest to the object side, the doublet lens including a negative lens and a positive lens sequentially arranged from the object side, and the zoom lens system may satisfy a following condition:

$$1.5 < Vd_{12}/Vd_{11} < 2.5,$$

where $Vd_{11}$ is to an $Abbe_{number}$ of the negative lens of the doublet lens, and $Vd_{12}$ is an Abbe number of the positive lens of the doublet lens.

The first lens group may include at least four lenses each having an Abbe number of about 95 or greater.

The third lens group may include a positive lens and a negative lens sequentially arranged from the object side, and at least one surface of the negative lens may be aspherical.

An Abbe number of the positive lens of the third lens group may be less than an Abbe number of the negative lens of the third lens group.

The zoom lens system may satisfy a following condition:

$$30 < Vd_{32} < 38,$$

where $Vd_{32}$ is an $Abbe_{number}$ of the negative lens of the third lens group.

Each of the second lens group, the third lens group, the fourth lens group may include at least one lens having an aspherical surface.

The zoom lens system may include at least five lenses each having a refractive index of about 2.0 or greater.

The sixth lens group may include a triplet lens including three lenses cemented together.

According to one or more embodiments, there is provided a zoom lens system which may include: a first lens group having a positive refractive power; a second lens group having a negative refractive power; a third lens group having a positive refractive power; a fourth lens group having a positive refractive power; a fifth lens group having a positive refractive power; and a sixth lens group having a positive refractive power, wherein the first to sixth lens groups are sequentially arranged along an optical axis from an object side to an image plane side, zooming is performed by moving the second lens group, the fourth lens group, and the fifth lens group along the optical axis, a distance measured in a direction parallel to the optical axis between a focal point of light having a wavelength of about 546 nm and a focal point of light having a wavelength of about 850 nm is about 30 μm or less, and the zoom lens system satisfies a following condition:

$$15 < \frac{f_t}{f_w} < 30,$$

where $f_w$ is a focal length at a wide-angle position, and $f_t$ is a focal length at a telephoto position.

Other aspects will be clearly understood from the following detailed description, claims, and accompanying drawings.

BRIEF DESCRIPTION OF THE DRAWINGS

These and/or other aspects will become apparent and more readily appreciated from the following description of the exemplary embodiments, taken in conjunction with the accompanying drawings, in which:

FIG. 7 illustrates longitudinal spherical aberration, astigmatism, and distortion of the zoom lens system of the third exemplary embodiment at the wide-angle position.

DETAILED DESCRIPTION

Figure 1:
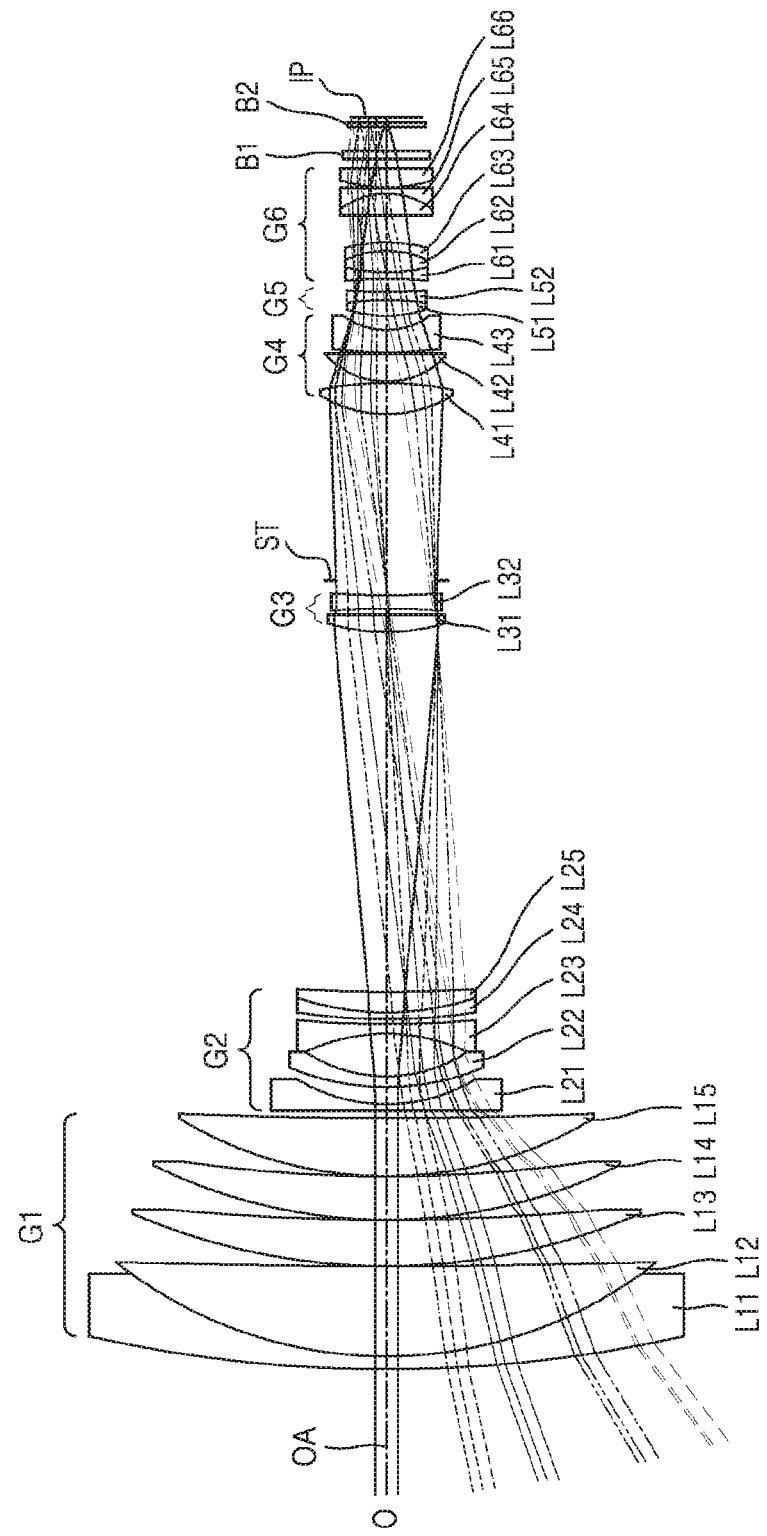
FIG. 1 illustrates an optical arrangement of a zoom lens system according to a first exemplary embodiment.

Reference will now be made in detail to exemplary embodiments which are illustrated in reference to the accompanying drawings. Effects and features of the exemplary embodiments, and implementation methods thereof will be clarified through the following descriptions in reference to the accompanying drawings. In this regard, these exemplary embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list. In the drawings, like reference numerals denote like elements, and overlapping descriptions thereof will be omitted.

In the following descriptions of the exemplary embodiments, although the terms "first" and "second" are used to describe various elements, these elements should not be limited by these terms. These terms are only used to distinguish one element from another element.

In the following descriptions of the exemplary embodiments, the terms of a singular form may include plural forms unless referred to the contrary.

In the following descriptions of the exemplary embodiments, the meaning of "include," "comprise," "including," or "comprising" specifies a property, a region, a fixed number, a step, a process, an element, a component, and a combination thereof but does not exclude other properties, regions, fixed numbers, steps, processes, elements, components, and combinations thereof.

In the drawings, the sizes of elements may be exaggerated for clarity. For example, in the drawings, the size or thickness of each element may be arbitrarily shown for illustrative purposes, and thus the inventive concept should not be construed as being limited thereto.

Figure 4:
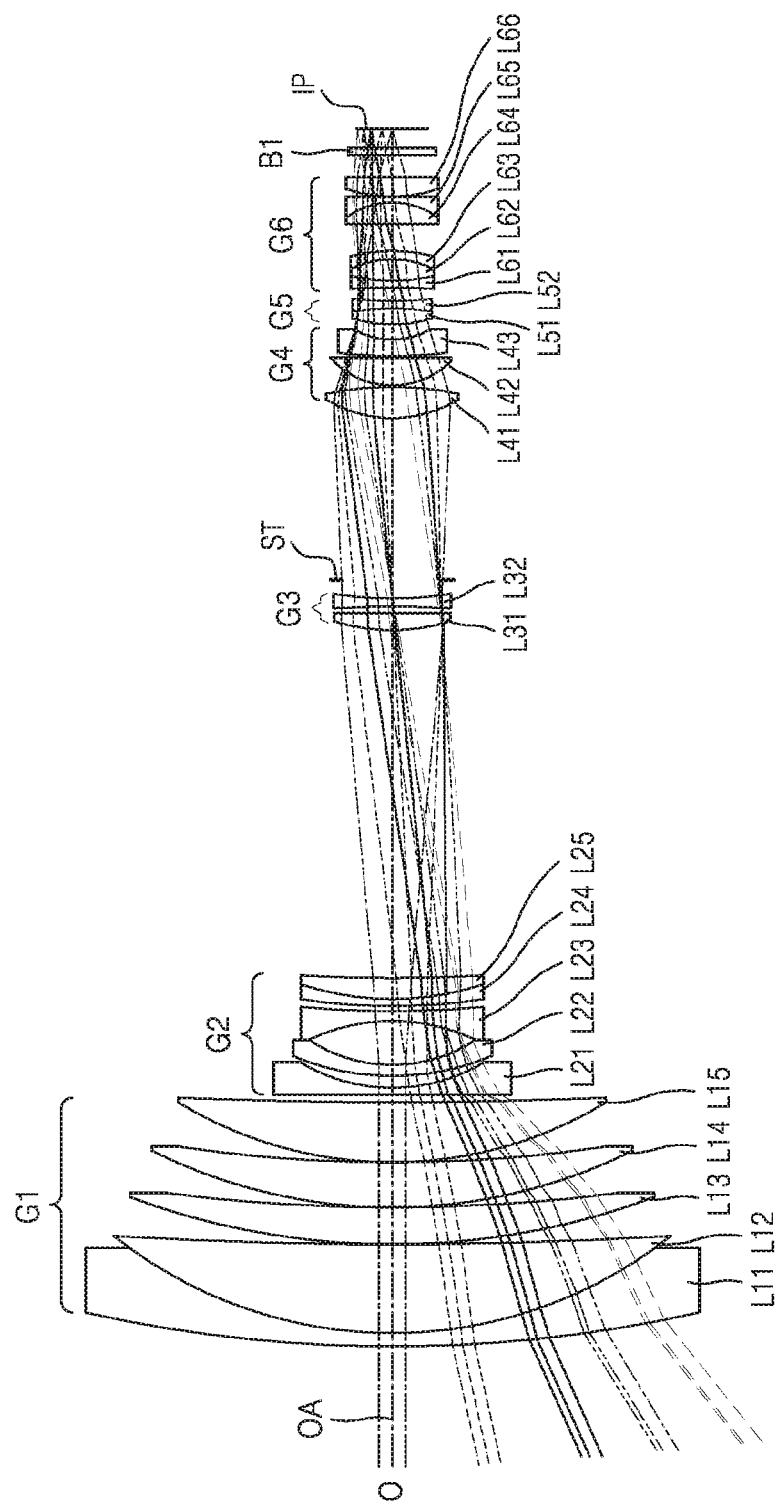
FIG. 4 illustrates an optical arrangement of a zoom lens system according to a second exemplary embodiment.
Figure 6:
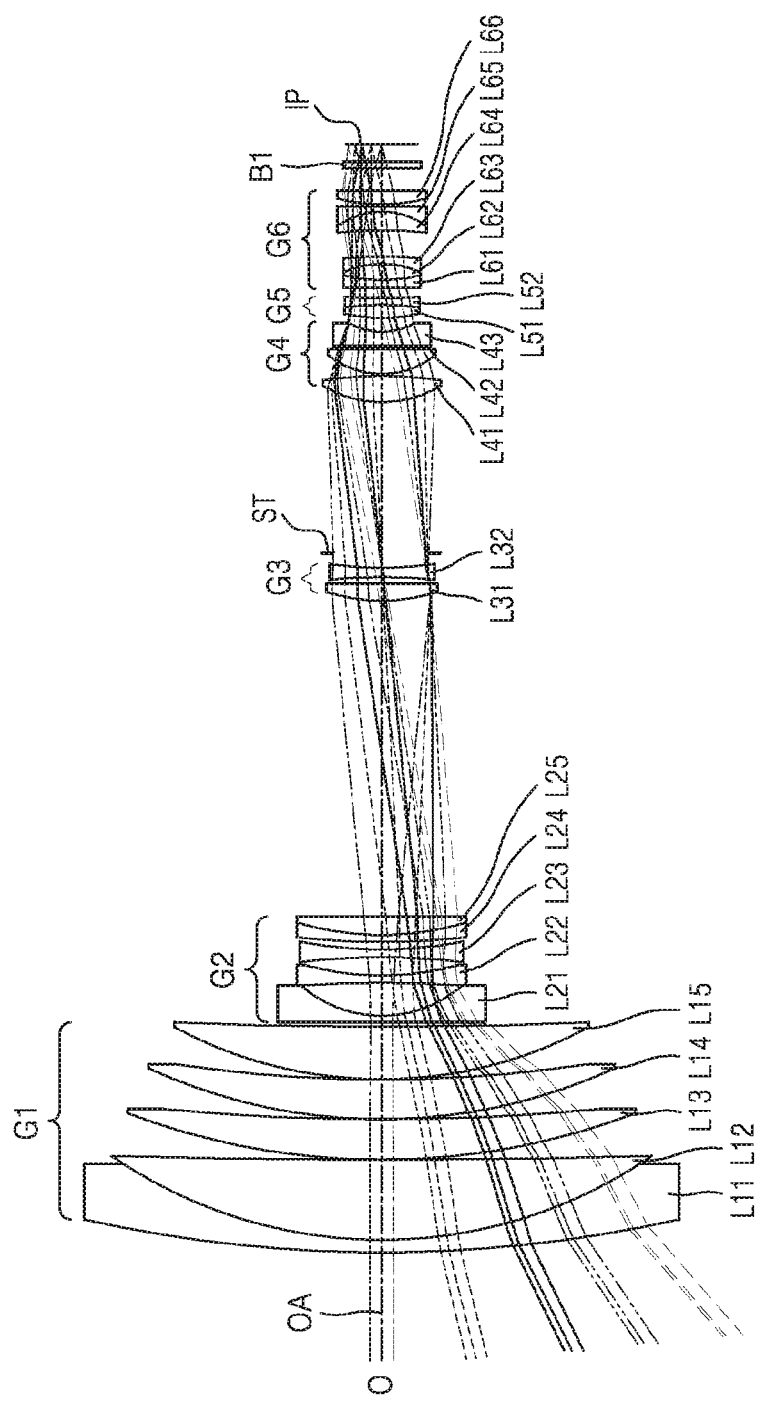
FIG. 6 illustrates an optical arrangement of a zoom lens system according to a third exemplary embodiment.

FIGS. 1, 4, and 6 illustrates optical arrangements of zoom lens systems according to exemplary embodiments.

Referring to FIGS. 1, 4, and 6, each of the zoom lens systems may include a first lens group G1 having a positive refractive power, a second lens group G2 having a negative refractive power, a third lens group G3 having a positive refractive power, a fourth lens group G4 having a positive refractive power, a fifth lens group G5 having a positive refractive power, and a sixth lens group G6 having a positive refractive power. The first to sixth lens groups G1 to G6 are sequentially arranged from an object (O) side to an image plane (IP) side. An aperture stop ST may be placed between the third lens group G3 and the fourth lens group G4, and optical blocks B1 and B2 may be placed between the sixth lens group G6 and an image plane IP.

According to an exemplary embodiment, chromatic aberration of each of the zoom lens systems may be corrected in a range from a visible ray to a near infrared (NIR) ray, and thus, the zoom lens system may be applied to photographing apparatuses such as surveillance cameras that operate both at night as well as in the daytime.

According to an exemplary embodiment, the optical blocks B1 and B2 may be an NIR-cut filter B1 and cover glass B2, respectively. The NIR-cut filter B1 may be turned on/off by a controller (not shown) which may be implemented by a hardware processor, at least one software module, firmware and/or a combination thereof. For example, in the daytime, the NIR-cut filter B1 may be disposed on a path of light between the sixth lens group G6 and the image plane IP so as to use a visible ray for photographing, and at night, the NIR-cut filter B1 may be outside the path so as to use an NIR ray for photographing. In FIGS. 4 and 6, only the optical block B1 is illustrated.

However, each of the zoom lens systems illustrated in FIGS. 4 and 6 may include two optical blocks, for example, the optical blocks B1 and B2.

Each of the zoom lens systems may perform zooming by moving the second lens group G2, the fourth lens group G4, and the fifth lens group G5 along an optical axis OA, and the first lens group G1, the third lens group G3, and the sixth lens group G6 may be fixed. The aperture stop ST may be adjacent to the third lens group G3, and may not be moved during zooming.

According to an exemplary embodiment, each of the zoom lens systems may perform zooming from a wide-angle position to a telephoto position, and may have high optical performance in an NIR region as well as in a visible region. When a wavelength corresponding to green light is referred to as a first wavelength $\lambda_1$ and a wavelength corresponding to NIR light is referred to as a $\lambda_2$, a distance between a focal point of light having the first wavelength $\lambda_1$ and a focal point of light having the second wavelength $\lambda_2$ may be about 50 µm or less at the wide-angle position and the telephoto position. The first wavelength $\lambda_1$ may be about 546 nm, and the second wavelength $\lambda_2$ may be about 850 nm. The above-mentioned distance is a distance measured in a direction parallel to the optical axis OA.

According to an exemplary embodiment, since a difference between a focal point of visible light directed to the image plane IP and a focal point of NIR light directed to the image plane IP is very small over an entire region of the image plane IP, focal point misalignment may be suppressed during transition from a daytime photographing mode to a night photographing mode, and thus, high-resolution photographing may be possible at night as well as in the daytime. That is, the sharpness of images captured at night may be improved, and thus double images may not be captured.

According to an exemplary embodiment, at the wide-angle position, the distance between the focal point of light having the first wavelength $\lambda_1$ and the focal point of light having the second wavelength $\lambda_2$ may be about 30 µm or less, for example, about 20 µm or less. This will be described later with reference to FIG. 3.

Each of the zoom lens systems of the exemplary embodiments may satisfy Condition 1 below.

$$15 < \frac{f_t}{f_w} < 30, \quad \langle\text{Condition 1}\rangle$$

where $f_w$ is a focal length at the wide-angle position, and $f_t$ is a focal length at the telephoto position.

Condition 1 represents zoom magnification of each of the zoom lens systems. If each of the zoom lens systems satisfies Condition 1, each of the zoom lens systems has zoom magnification of greater than 15. That is, according to an exemplary embodiment, each of the zoom lens systems may have zoom magnification greater than 15, and may correct aberration in a range from a visible ray to an NIR ray.

Each of the zoom lens systems of the exemplary embodiments may satisfy Condition 2 below.

$$\frac{TL}{f_t/f_w} < 8, \quad \langle\text{Condition 2}\rangle$$

where TL is a distance between the image plane IP and an object-side surface of a first lens L11 of the first lens group G1 which is closest to the object side to the image plane IP.

Condition 2 refers to a ratio of an entire length of each of the zoom lens systems to the zoom magnification of each of the zoom lens systems. If the ratio is equal to or greater than the upper limit, the entire length of each of the zoom lens systems may be excessively large compared to the zoom magnification of a zoom lens system. That is, each of the zoom lens systems may have a large size, and it may be difficult to miniaturize the zoom lens systems.

The number of lenses and/or the entire length of a zoom lens system may be increased so as to correct aberration of the zoom lens system in a wide range. However, since lenses of the lens groups of the zoom lens systems of the exemplary embodiments are optimized, the zoom lens systems may be miniaturized to have an entire length of less than about 140 mm even though the zoom lens systems have high zoom magnification on a level of greater than about 15.

Each of the zoom lens systems of the exemplary embodiments may satisfy Condition 3 below.

$$2.5 < \frac{f_1}{f_4} < 3.0, \quad \langle\text{Condition 3}\rangle$$

where $f_1$ is a focal length of the first lens group G1, and $f_4$ is a focal length of the fourth lens group G4.

Condition 3 represents a range of a ratio of the focal length of the first lens group G1 to the focal length of the fourth lens group G4 for correcting chromatic aberration of a zoom lens system. If the ratio is outside the range, it may be difficult to correct chromatic aberration of each of the zoom lens systems.

The first lens group G1 may have a positive refractive power, and five lenses may be included in the first lens group G1. The first lens group G1 may be fixed, and may include the first lens L11 having a negative refractive power, a second lens L12 having a positive refractive power, a third lens L13 having a positive refractive power, a fourth lens L14 having a positive refractive power, and a fifth lens L15 having a positive refractive power. Here, the first to fifth lenses L11 to L15 may be sequentially arranged from the object side to the image plane side. The first lens group G1 may include one negative lens and four positive lenses, and a negative lens (the first lens L11) and a positive lens (the second lens L12) which are closest to the object side and sequentially arranged from the object side may form a doublet lens.

That is, the first lens L11 and the second lens L12 may form a doublet lens that is closest to the object side among the lenses of the first lens group G1, and may be used for correcting chromatic aberration at the wide-angle position.

Each of the zoom lens systems of the exemplary embodiments may satisfy Condition 4 below.

$$1.5 < Vd_{12}/Vd_{11} < 2.5 \quad \langle\text{Condition 4}\rangle$$

In Condition 4, $Vd_{11}$ is an Abbe number of the negative lens (the first lens L11) of the doublet lens of the first lens group G1, and $Vd_{12}$ is an Abbe number of the positive lens (the second lens L12) of the doublet lens of the first lens group G1. If $Vd_{11}/Vd_{12}$ is outside the above range, it may be difficult to focus an NIR ray and a visible ray at the same time and miniaturize a zoom lens system. $Vd_{11}$ and $Vd_{12}$ are the Abbe numbers measured at a D-line wavelength of about 587.56 nm. In the following description, refractive indexes and Abbe numbers are values measured at the D-line wavelength of about 587.56 nm.

The first lens group G1 includes at least four lenses each having an Abbe number of about 95 or greater. According to an exemplary embodiment, each of the second lens L12, the third lens L13, the fourth lens L14, and the fifth lens L15 may have an Abbe number of about 95 or greater. That is, since the first lens group G1 includes four low-dispersion lenses, aberration may be corrected in the NIR region.

The second lens group G2 may have a negative refractive power, and five lenses may be included in the second lens group G2. The second lens group G2 may be moved along the optical axis OA during zooming, and may include a sixth lens L21 having a negative refractive power, a seventh lens L22 having a negative refractive power, an eighth lens L23 having a negative refractive power, a ninth lens L24 having a negative refractive power, and a tenth lens L25 having a positive refractive power. Here, the sixth to tenth lenses L21 to L25 may be sequentially arranged from the object side to the image plane side.

The second lens group G2 may include four negative lenses and one positive lens, and a negative lens (the ninth lens L24) and a positive lens (the tenth lens L25) which are closest to the image plane side may form a doublet lens. The second lens group G2 may include at least one lens having an aspherical surface. According to an exemplary embodiment, both surfaces of each of the seventh lens L22 and the eighth lens L23 may be aspherical.

The third lens group G3 may have a positive refractive power, and two lenses may be included in the third lens group G3. The third lens group G3 may be fixed, and may include an eleventh lens L31 having a positive refractive power and a twelfth lens L32 having a negative refractive power. Here, the eleventh lens L31 and the twelfth lens L32 may be sequentially arranged from the object side to the image plane side. The negative lens (the twelfth lens L32) of the third lens group G3 may have at least one aspherical surface. According to an exemplary embodiment, both surfaces of the twelfth lens L32 may be aspherical.

An Abbe number of the positive lens (the eleventh lens L31) of the third lens group G3 may be less than an Abbe number of the negative lens (the twelfth lens L32) of the third lens group G3, and the negative lens (the twelfth lens L32) may satisfy Condition 5 below.

$$30 < Vd_{32} < 38 \qquad \text{<Condition 5>}$$

where $Vd_{32}$ refers to the Abbe number of the negative lens of the third lens group G3.

The third lens group G3 is fixed and configured to compensate for tilting of the first lens group G1. That is, if the first lens group G1 is tilted by an angle of about 0.1 degree to about 0.2 degree due to assembly tolerance, optical performance of a zoom lens system may decrease. In each of the zoom lens systems of the exemplary embodiments, however, tilting of the first lens group G1 is compensated for by the third lens group G3 including two lenses and an aspherical surface formed on at least one of the two lenses. That is, although the first lens group G1 is tilted by a certain angle, the third lens group G3 compensates for the tilting of the first lens group G1, and thus prevents decrease in the optical performance of the zoom lens system. For example, the third lens group G3 may correct comma aberration caused by tilting of the first lens group G1.

The fourth lens group G4 may have a positive refractive power, and three lenses may be included in the fourth lens group G4. The fourth lens group G4 may be moved along the optical axis OA during zooming, and may include a thirteenth lens L41 having a positive refractive power, a fourteenth lens L42 having a positive refractive power, and a fifteenth lens L43 having a negative refractive power. Here, the thirteenth to fifteenth lenses L41 to L43 may be sequentially arranged from the object side to the image plane side. The fourth lens group G4 may include at least one lens having an aspherical surface. According to an exemplary embodiment, both surfaces of each of the fourteenth lens L42 and the fifteenth lens L43 may be aspherical.

As described above, each of the second lens group G2, the third lens group G3, and the fourth lens group G4 includes a lens having an aspherical surface, and thus aberration of a zoom lens system may be corrected while minimizing the number of lenses of the zoom lens system. That is, the zoom lens system may have a small size and a high degree of resolution at the same time.

The fifth lens group G5 may have a positive refractive power, and two lenses may be included in the fifth lens group G5. The fifth lens group G5 may be moved along the optical axis OA during zooming, and may include a sixteenth lens L51 having a positive refractive power and a seventeenth lens L52 having a negative refractive power. Here, the sixteenth lens L51 and the seventeenth lens L52 may be sequentially arranged from the object side to the image plane side. The sixteenth lens L51 and the seventeenth lens L52 may form a doublet lens.

The sixth lens group G6 may have a positive refractive power, and six lenses may be included in the sixth lens group G6. The sixth lens group G6 may be fixed, and may include an eighteenth lens L61 having a negative refractive power, a nineteenth lens L62 having a positive refractive power, a twentieth lens L63 having a negative refractive power, a twenty-first lens L64 having a positive refractive power, a twenty-second lens L65 having a negative refractive power, and a twenty-third lens L66 having a positive refractive power. Here, the eighteenth to twenty-third lenses L61 to L66 may be sequentially arranged from the object side to the image plane side. The eighteenth lens L61, the nineteenth lens L62, and the twentieth lens L63 may form a triplet lens, and the twenty-first lens L64 and the twenty-second lens L65 may form a doublet lens.

The sixth lens group G6 is closest to the image plane side, and includes the triplet lens and the doublet lens. Thus, chromatic aberration may be easily corrected in a range from a visible ray to an NIR ray without increasing an entire length of a zoom lens system.

According to an exemplary embodiment, a zoom lens system may include at least five lenses each having a refractive index of about 2.0 or greater. According to an exemplary embodiment, at least one lens having a refractive index of about 2.0 or greater may be included in the second lens group G2, the fifth lens group G5, and the sixth lens group G6 that are required to have a sufficiently high degree of refractive power.

The above-described configuration makes it possible to implement six-group zoom lens systems having high magnification and guaranteeing high-resolution photographing at night as well as in the daytime by correcting chromatic aberration in a range from a visible ray to an NIR ray. In addition, a zoom lens system of which aberration is corrected in a peripheral region as well as in a center region of a screen may be implemented.

Hereinafter, design data of the zoom lens systems of the exemplary embodiments will be described with reference to Tables 1 to 10.

In the design data, f refers to a focal length [mm], Fno refers to an F-number, R refers to a radius of curvature of each lens in millimeters [mm] (R of a flat surface is indicated by infinity), and Dn refers to a distance between lens surfaces along an optical axis in millimeters [mm], that is, a thickness of a lens or the distance between lenses. Nd refers to a refractive index of each lens at the D-line, and vd refers to an Abbe number of each lens at the D-line.

In the exemplary embodiments, the term "aspherical surface (ASP)" is defined as follows.

$$z = \frac{ch^2}{1 + \sqrt{1 - (1+K)c^2 h^2}} + Ah^4 + Bh^6 + Ch^8 + Dh^{10}$$

In the exemplary embodiments, aspherical surfaces of the zoom lens systems may be expressed by a condition shown above, where a z-axis denotes an optical axis, an h-axis denotes a direction perpendicular to the optical axis, and a propagation direction of light rays is denoted as being positive. In addition, z denotes a distance measured from a vertex of a lens in the direction of the optical axis of the lens, h denotes a distance measured from the optical axis in a direction perpendicular to the optical axis, K denotes a conic constant, A, B, C, and D denote aspherical surface coefficients, and c denotes a reciprocal (1/R) of a radius of curvature at the vertex of the lens.

First Exemplary Embodiment

Table 1 shows design data of the zoom lens system illustrated in FIG. 1 according to a first exemplary embodiment. A surface number Si is given to an $i_{th}$ surface as follows: an object-side surface of the first lens L11 is numbered S1, and other surfaces of lenses are sequentially numbered in a direction toward the image plane side.

TABLE 1

| Surface number | R | Dn | Nd | vd |
|---|---|---|---|---|
| S1 | 161.3073 | 1.2 | 1.7725 | 49.62353 |
| S2 | 49.60646 | 9.788782 | 1.437001 | 95.09901 |
| S3 | 710.2828 | 0.15 | | |

TABLE 1-continued

| Surface number | R | Dn | Nd | vd |
|---|---|---|---|---|
| S4 | 74.48715 | 4.819162 | 1.437001 | 95.09901 |
| S5 | 275.5854 | 0.15 | | |
| S6 | 59.7132 | 4.621579 | 1.437001 | 95.09901 |
| S7 | 170.0633 | 0.15 | | |
| S8 | 46.48597 | 6.114953 | 1.437001 | 95.09901 |
| S9 | 508.9558 | D1 | | |
| S10 | 4500 | 0.8 | 2.001003 | 29.13422 |
| S11 | 18.75952 | 1.906669 | | |
| S12* | 70.3387 | 1 | 1.851348 | 40.10384 |
| S13* | 19.76707 | 4.701764 | | |
| S14* | −28.6413 | 1 | 1.497103 | 81.55838 |
| S15* | 49.45975 | 0.621654 | | |
| S16 | 83.00385 | 0.75 | 1.437001 | 95.09901 |
| S17 | 31.02174 | 2.199724 | 2.000694 | 25.45794 |
| S18 | 390.0118 | D2 | | |
| S19 | 23.97392 | 1.885876 | 1.922859 | 20.88308 |
| S20 | −163.238 | 0.676691 | | |
| S21* | −53.1582 | 1 | 1.83441 | 37.28453 |
| S22* | 38.95801 | 1.907673 | | |
| S23(Stop) | infinity | D3 | | |
| S24 | 15.70347 | 3.192011 | 1.437001 | 95.09901 |
| S25 | −33.9593 | 0.2 | | |
| S26* | 9.567328 | 3.101081 | 1.497103 | 81.55838 |
| S27* | −152.006 | 0.2 | | |
| S28* | 166.7255 | 2.185762 | 1.68893 | 31.16001 |
| S29* | 8.079782 | D4 | | |
| S30 | 19.54246 | 1.661524 | 2.000694 | 25.45794 |
| S31 | −28.9042 | 0.75 | 2.002723 | 19.31684 |
| S32 | 28.9042 | D5 | | |
| S33 | −57.3666 | 0.75 | 2.104199 | 17.01815 |
| S34 | 14.56482 | 2.374102 | 1.620409 | 60.34296 |
| S35 | −9.07861 | 0.75 | 1.592703 | 35.44502 |
| S36 | −30.7845 | 3.159549 | | |
| S37 | −104.337 | 2.13109 | 2.104199 | 17.01815 |
| S38 | −8.61595 | 0.75 | 2.001003 | 29.13422 |
| S39 | 227.1092 | 0.2 | | |
| S40 | 21.11847 | 1.764363 | 2.104199 | 17.01815 |
| S41 | 1071.543 | 1.234498 | | |
| S42 | infinity | 0.6 | 1.516798 | 64.19733 |
| S43 | infinity | 2.7744 | | |
| S44 | infinity | 0.5 | 1.516798 | 64.19733 |
| S45 | infinity | 0.4 | | |
| IP | infinity | 0 | | |

In Table 1 above, * refers to an aspherical surface, and Table 2 below shows aspherical surface coefficients of aspherical surfaces of the zoom lens system of the first exemplary embodiment illustrated in FIG. 1. E−m (m is an integer) in aspherical surface coefficients refers to ×10$^{-m}$.

TABLE 2

| Surface number | Aspherical surface coefficients | | | | |
|---|---|---|---|---|---|
| | K | A | B | C | D |
| S12 | 0 | 5.54E−05 | 4.64E−07 | −1.7E−09 | 0 |
| S13 | 0 | 1.1101E−05 | 2.9185E−07 | 2.0422E−09 | 0 |
| S14 | 0 | −5.06E−05 | −6.25E−07 | 6.04E−09 | 0 |
| S15 | 0 | −3.8E−05 | −5.2E−08 | 1.58E−09 | 0 |
| S21 | 0 | 3.42E−05 | −3.7E−07 | 2.46E−09 | 0 |
| S22 | 0 | 3.96E−05 | −3.9E−07 | 3.09E−09 | 0 |
| S26 | −0.2607 | 5.1841E−06 | 7.4082E−07 | 1.3314E−09 | −1.68E−10 |
| S27 | 0 | 0.00011 | −6.2E−07 | −2.4E−08 | 0 |
| S28 | 0 | 8.75E−06 | −8E−07 | −3.9E−09 | 0 |
| S29 | 0 | 2.23E−05 | 4.34E−07 | −1.8E−09 | 0 |

Table 3 below shows a focal length, F-number Fno, and variable distances of the zoom lens system of the first exemplary embodiment illustrated in FIG. 1 at the wide-angle position and the telephoto position.

TABLE 3

|     | Wide-angle position | Telephoto position |
| --- | --- | --- |
| f   | 5.133425 | 92.89055 |
| Fno | 1.89 | 7.695727 |
| D1  | 0.8 | 39 |
| D2  | 38.8 | 0.6 |
| D3  | 18.2062 | 0.875 |
| D4  | 1.67221 | 7.59 |
| D5  | 1.39869 | 12.8121 |

Figure 2:
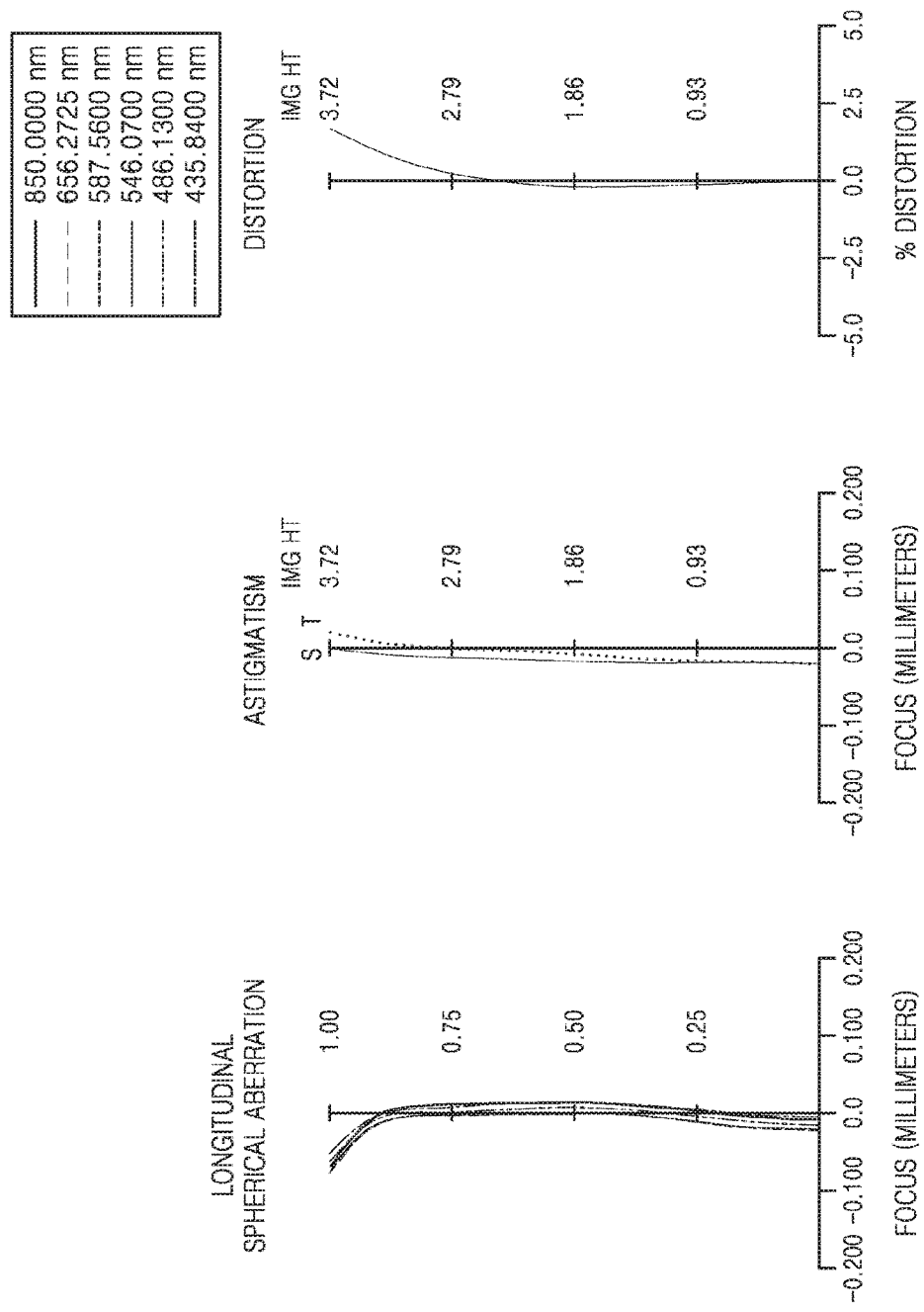
FIG. 2 illustrates longitudinal spherical aberration, astigmatism, and distortion of the zoom lens system of the first exemplary embodiment at a wide-angle position.

FIG. 2 illustrates longitudinal spherical aberration, astigmatism, and distortion of the zoom lens system of the first exemplary embodiment at the wide-angle position.

In FIG. 2, the longitudinal spherical aberration is illustrated for light wavelengths of 850 nm, 656.2725 nm, 587.56 nm, 546.07 nm, 486.13 nm, and 435.84 nm, and astigmatism and distortion are illustrated for a light wavelength of 546.07 nm. In the astigmatism, a dotted curve T refers to a tangential surface T, and a solid line refers to a sagittal surface S.

Referring to FIG. 2, aberration is corrected over an entire image height from a center region to an edge region of the image plane IP. For example, chromatic aberration virtually does not occur from a center region to an edge region of the image plane IP in a range from a blue wavelength of 435.84 nm to an NIR wavelength of 850 nm. According to an exemplary embodiment, a maximum distance between focal points of light having wavelengths in a range of 435.84 nm to 850 nm may be about 20 μm or less.

Figure 3:
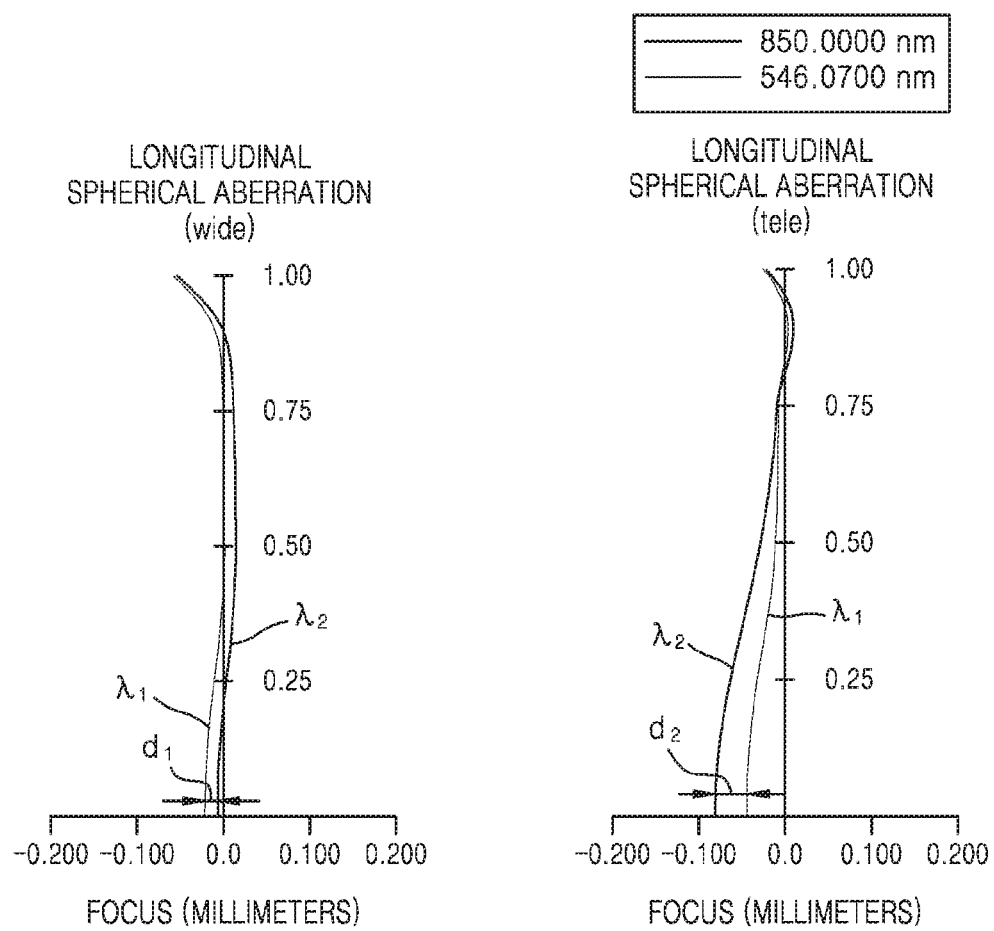
FIG. 3 illustrates longitudinal spherical aberration of the zoom lens system of the first exemplary embodiment at the wide-angle position and a telephoto position for light having a first wavelength and light having a second wavelength.

FIG. 3 illustrates longitudinal spherical aberration of the zoom lens system of the first exemplary embodiment at the wide-angle position and the telephoto position for light having a first wavelength $\lambda_1$ and light having a second wavelength $\lambda_2$.

Referring to FIG. 3, a distance between a focal point of light having a first wavelength $\lambda_1$ corresponding to green light and a focal point of light having a second wavelength $\lambda_2$ corresponding NIR light is about 50 μm or less both at the wide-angle position and the telephoto position (refer to $d_1$ and $d_2$ in FIG. 3). According to an exemplary embodiment, the first wavelength $\lambda_1$ may be about 546.07 nm, and the second wavelength $\lambda_2$ may be about 850 nm. The above-mentioned distance is a distance measured in a direction parallel with the optical axis OA.

According to an exemplary embodiment, since a difference between the focal point of visible light directed to the image plane IP and the focal point of NIR light directed to the image plane IP is very small over the entire region of the image plane IP, focal point misalignment may be suppressed during transition from a daytime photographing mode to a night photographing mode, and thus high-resolution photographing may be possible at night as well as in the daytime. That is, the sharpness of images captured at night may be improved, and thus double images may not be captured.

Second Exemplary Embodiment

Table 4 shows design data of the zoom lens system illustrated in FIG. 4 according to a second exemplary embodiment.

TABLE 4

| Surface number | R | Dn | Nd | vd |
| --- | --- | --- | --- | --- |
| S1  | 146.2687 | 1.2 | 1.7725 | 49.62353 |
| S2  | 47.88151 | 9.897633 | 1.437001 | 95.09901 |
| S3  | 582.7554 | 0.15 | | |
| S4  | 82.26386 | 4.219567 | 1.437001 | 95.09901 |
| S5  | 261.5005 | 0.15 | | |
| S6  | 59.06205 | 4.653024 | 1.437001 | 95.09901 |
| S7  | 165.8139 | 0.15 | | |
| S8  | 45.04751 | 6.484487 | 1.437001 | 95.09901 |
| S9  | 744.4916 | D1 | | |
| S10 | 4500 | 0.8 | 2.001003 | 29.13422 |
| S11 | 18.94811 | 1.813871 | | |
| S12* | 58.00663 | 1 | 1.851348 | 40.10384 |
| S13* | 19.2397 | 4.731306 | | |
| S14* | −28.1172 | 1 | 1.497103 | 81.55838 |
| S15* | 49.77147 | 0.707775 | | |
| S16 | 95.78849 | 0.75 | 1.437001 | 95.09901 |
| S17 | 32.25955 | 2.138739 | 2.000694 | 25.45794 |
| S18 | 387.2212 | D2 | | |
| S19 | 23.41562 | 1.901214 | 1.922859 | 20.88308 |
| S20 | −167.627 | 0.666975 | | |
| S21* | −55.36 | 1 | 1.83441 | 37.28453 |
| S22* | 37.29334 | 1.92279 | | |
| S23(Stop) | infinity | D3 | | |
| S24 | 16.17486 | 3.127135 | 1.437001 | 95.09901 |
| S25 | −32.39 | 0.2 | | |
| S26* | 9.080365 | 2.99637 | 1.497103 | 81.55838 |
| S27* | 188.334 | 0.2 | | |
| S28* | 61.37675 | 1.962806 | 1.68893 | 31.16001 |
| S29* | 7.645293 | D4 | | |
| S30 | 18.60194 | 1.705176 | 2.000694 | 25.45794 |
| S31 | −27.0356 | 0.75 | 2.002723 | 19.31684 |
| S32 | 27.03555 | D5 | | |
| S33 | −52.4208 | 0.75 | 2.104199 | 17.01815 |
| S34 | 13.18829 | 2.628285 | 1.620409 | 60.34296 |
| S35 | −7.67977 | 0.75 | 1.592703 | 35.44502 |
| S36 | −28.9616 | 3.154324 | | |
| S37 | 169.5776 | 2.334693 | 2.104199 | 17.01815 |
| S38 | −8.68439 | 0.75 | 2.001003 | 29.13422 |
| S39 | 60.05722 | 0.2 | | |
| S40 | 22.27904 | 1.765397 | 2.104199 | 17.01815 |
| S41 | −818.967 | 2.388201 | | |
| S42 | infinity | 1.1 | 1.516798 | 64.19733 |
| S43 | infinity | 2 | | |
| IF  | infinity | 0 | | |

In Table 4 above, * refers to an aspherical surface, and Table 5 below shows aspherical surface coefficients of aspherical surfaces of the zoom lens system of the second exemplary embodiment illustrated in FIG. 4. E−m (m is an integer) in aspherical surface coefficients refers to ×10$^{-m}$.

TABLE 5

| Surface number | Aspherical surface coefficients | | | | |
| --- | --- | --- | --- | --- | --- |
|     | K | A | B | C | D |
| S12 | 0 | 5.18E−05 | 3.58E−07 | −1.2E−09 | 0 |
| S13 | 0 | 4.05E−05 | 1.54E−07 | 1.75E−09 | 0 |
| S14 | 0 | −4.7E−05 | −7E−07 | 6.52E−09 | 0 |
| S15 | 0 | −3.6E−05 | −6.8E−08 | 2.24E−09 | 0 |
| S21 | 0 | 3.44E−05 | −3.6E−07 | 1.91E−09 | 0 |
| S22 | 0 | 3.94E−05 | −3.7E−07 | 2.3E−09 | 0 |
| S26 | 0.25669 | 1.54E−05 | 8.21E−07 | −2.6E−10 | −1.8E−10 |
| S27 | 0 | 0.000115 | −4.2E−07 | −1.8E−08 | 0 |
| S28 | 0 | 1.12E−05 | −7.9E−07 | 4.49E−09 | 0 |
| S29 | 0 | 5.79E−06 | 6.27E−08 | −6.6E−09 | 0 |

Table 6 below shows a focal length, F-number Fno, and variable distances of the zoom lens system of the second exemplary embodiment illustrated in FIG. 4 at the wide-angle position and the telephoto position.

TABLE 6

|  | Wide-angle position | Telephoto position |
|---|---|---|
| f | 5.152623 | 93.23794 |
| Fno | 1.936862 | 7.669185 |
| D1 | 0.8 | 38.9401 |
| D2 | 38.7401 | 0.6 |
| D3 | 18.2219 | 0.875 |
| D4 | 1.71327 | 8.01644 |
| D5 | 1.42493 | 12.4687 |

Figure 5:
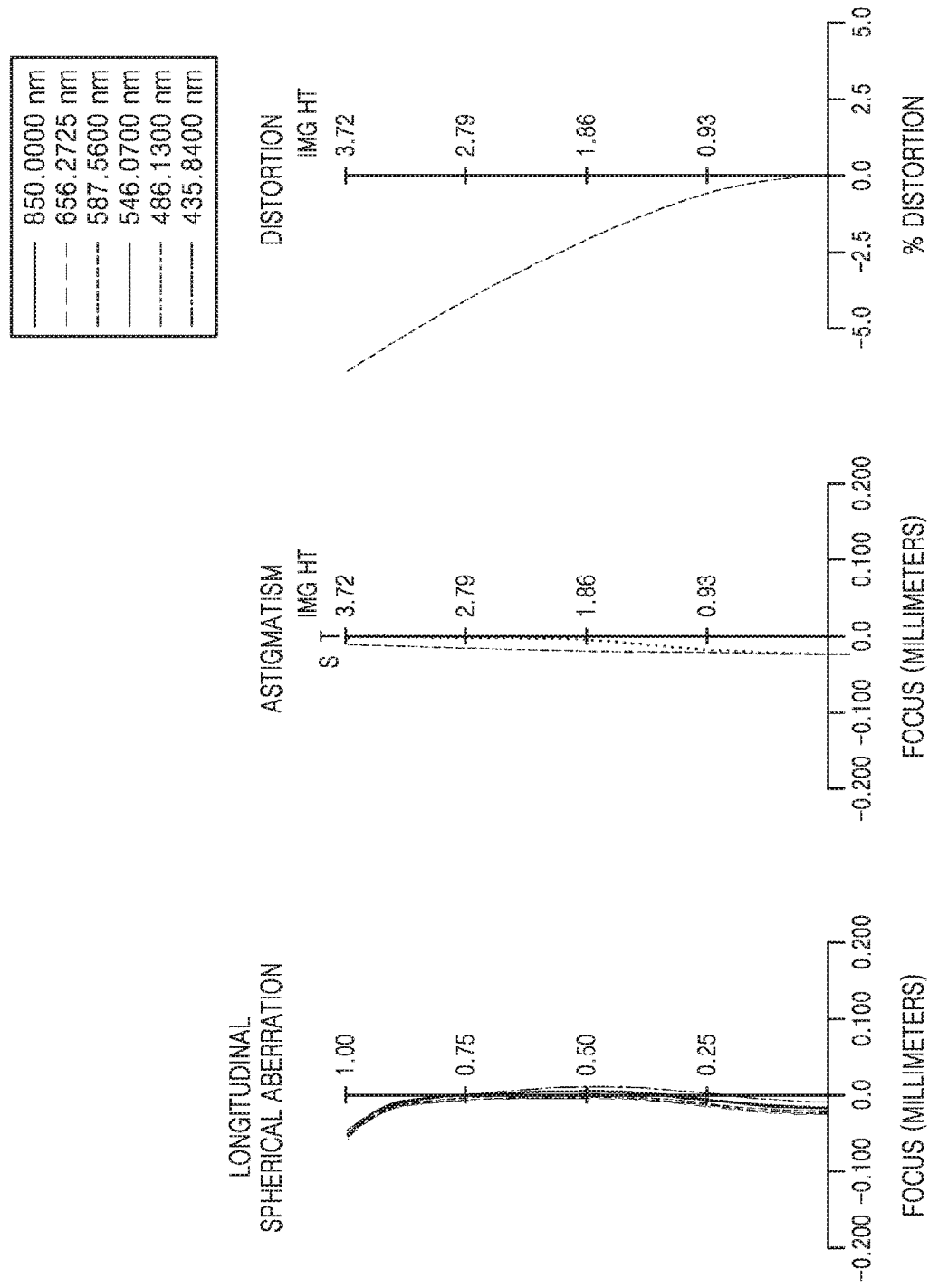
FIG. 5 illustrates longitudinal spherical aberration, astigmatism, and distortion of the zoom lens system of the second exemplary embodiment at a wide-angle position.

FIG. 5 illustrates longitudinal spherical aberration, astigmatism, and distortion of the zoom lens system of the second exemplary embodiment at the wide-angle position.

In FIG. 5, the longitudinal spherical aberration is illustrated for light wavelengths of 850 nm, 656.2725 nm, 587.56 nm, 546.07 nm, 486.13 nm, and 435.84 nm, and the astigmatism and distortion are illustrated for a light wavelength of 546.07 nm. In the astigmatism, a dotted curve T refers to a tangential surface T, and a solid line refers to a sagittal surface S.

Referring to FIG. 5, aberration is corrected over an entire image height from a center region to an edge region of the image plane IP. For example, chromatic aberration virtually does not occur from a center region to an edge region of the image plane IP in a range from a blue wavelength of 435.84 nm to an NIR wavelength of 850 nm. According to an exemplary embodiment, a maximum distance between the focal points of light having wavelengths in a range of 435.84 nm to 850 nm may be about 20 μm or less.

Third Exemplary Embodiment

Table 7 shows design data of the zoom lens system illustrated in FIG. 6 according to a third exemplary embodiment.

TABLE 7

| Surface number | R | Dn | Nd | vd |
|---|---|---|---|---|
| S1 | 154.7581 | 1.2 | 1.7725 | 49.62353 |
| S2 | 52.41213 | 9.917117 | 1.437001 | 95.09901 |
| S3 | 840.6902 | 0.15 | | |
| S4 | 79.87305 | 4.694342 | 1.437001 | 95.09901 |
| S5 | 282.0346 | 0.15 | | |
| S6 | 59.42279 | 4.802621 | 1.437001 | 95.09901 |
| S7 | 169.6174 | 0.15 | | |
| S8 | 46.60491 | 6.037953 | 1.437001 | 95.09901 |
| S9 | 386.3808 | D1 | | |
| S10 | 4500 | 0.8 | 2.001003 | 29.13422 |
| S11 | 14.51321 | 3.990926 | | |
| S12* | −93.8764 | 1 | 1.851348 | 40.10384 |
| S13* | 39.46452 | 2.13003 | | |
| S14* | −75.7304 | 1 | 1.497103 | 81.55838 |
| S15* | 37.77173 | 0.957001 | | |
| S16 | 119.3972 | 0.75 | 1.437001 | 95.09901 |
| S17 | 31.14824 | 2.30494 | 2.000694 | 25.45794 |
| S18 | −2373.42 | D2 | | |
| S19 | 23.78714 | 1.891438 | 1.922859 | 20.88308 |
| S20 | −206.919 | 0.628103 | | |
| S21* | −70.0493 | 1 | 1.83441 | 37.28453 |
| S22* | 36.84621 | 1.935468 | | |
| S23(Stop) | infinity | D3 | | |
| S24 | 15.24515 | 3.137716 | 1.437001 | 95.09901 |
| S25 | −36.4579 | 0.2 | | |
| S26* | 9.533632 | 3.124591 | 1.497103 | 81.55838 |
| S27* | −83.5159 | 0.2 | | |
| S28* | −1336.2 | 1.871527 | 1.68893 | 31.16001 |
| S29* | 8.463564 | D4 | | |
| S30 | 21.37068 | 1.584084 | 2.000694 | 25.45794 |
| S31 | −33.1852 | 0.75 | 2.002723 | 19.31684 |

TABLE 7-continued

| Surface number | R | Dn | Nd | vd |
|---|---|---|---|---|
| S32 | 33.18521 | D5 | | |
| S33 | −123.539 | 0.75 | 2.104199 | 17.01815 |
| S34 | 12.42223 | 2.388132 | 1.620409 | 60.34296 |
| S35 | −8.79044 | 0.75 | 1.592703 | 35.44502 |
| S36 | −45.4431 | 3.19605 | | |
| S37 | −36.9507 | 2.145429 | 2.104199 | 17.01815 |
| S38 | −7.46834 | 0.75 | 2.001003 | 29.13422 |
| S39 | −65.7676 | 0.2 | | |
| S40 | 19.48769 | 1.777397 | 2.104199 | 17.01815 |
| S41 | 147.3207 | 2.467747 | | |
| S42 | infinity | 1.1 | 1.516798 | 64.19733 |
| S43 | infinity | 2 | | |
| IP | infinity | 0 | | |

In Table 7 above, * refers to an aspherical surface, and Table 8 below shows aspherical surface coefficients of aspherical surfaces of the zoom lens system of the third exee embodiment illustrated in FIG. 6. E−m (m is an integer) in aspherical surface coefficients refers to ×10$^{-m}$.

TABLE 8

| Surface number | Aspherical surface coefficients | | | | |
|---|---|---|---|---|---|
| | K | A | B | C | D |
| S12 | 0 | 5.18E−05 | 3.58E−07 | −1.2E−09 | 0 |
| S13 | 0 | 4.05E−05 | 1.54E−07 | 1.75E−09 | 0 |
| S14 | 0 | −4.7E−05 | −7E−07 | 6.52E−09 | 0 |
| S15 | 0 | −3.6E−05 | −6.8E−08 | 2.24E−09 | 0 |
| S21 | 0 | 3.44E−05 | −3.6E−07 | 1.91E−09 | 0 |
| S22 | 0 | 3.94E−05 | −3.7E−07 | 2.3E−09 | 0 |
| S26 | 0.25669 | 1.54E−05 | 8.21E−07 | −2.6E−10 | −1.8E−10 |
| S27 | 0 | 0.000115 | −4.2E−07 | −1.8E−08 | 0 |
| S28 | 0 | 1.12E−05 | −7.9E−07 | 4.49E−09 | 0 |
| S29 | 0 | 5.79E−06 | 6.27E−08 | −6.6E−09 | |

Table 9 below shows a focal length, F-number Fno, and variable distances of the zoom lens system of the third exemplary embodiment illustrated in FIG. 6 at the wide-angle position and the telephoto position.

TABLE 9

|  | Wide-angle position | Telephoto position |
|---|---|---|
| f | 5.152623 | 93.23794 |
| Fno | 1.936862 | 7.669185 |
| D1 | 0.8 | 38.9401 |
| D2 | 38.7401 | 0.6 |
| D3 | 18.2219 | 0.875 |
| D4 | 1.71327 | 8.01644 |
| D5 | 1.42493 | 12.4687 |

FIG. 7 illustrates longitudinal spherical aberration, astigmatism, and distortion of the zoom lens system of the third exemplary embodiment at the wide-angle position.

In FIG. 7, the longitudinal spherical aberration is illustrated for light wavelengths of 850 nm, 656.2725 nm, 587.56 nm, 546.07 nm, 486.13 nm, and 435.84 nm, and the astigmatism and distortion are illustrated for a light wavelength of 546.07 nm. In the astigmatism, a dotted curve T refers to a tangential surface T, and a solid line refers to a sagittal surface S.

Referring to FIG. 7, aberration is corrected over an entire image height from a center region to an edge region of the image plane IP. For example, the chromatic aberration virtually does not occur from a center region to an edge region of the image plane IP in a range from a blue wavelength of 435.84 nm to an NIR wavelength of 850 nm. According to an exemplary embodiment, a maximum distance between the focal points of light having wavelengths in a range of 435.84 nm to 850 nm may be about 20 μm or less.

Table 10 below shows that the zoom lens systems of the exemplary embodiments satisfy Conditions 1 to 5.

TABLE 10

| Conditions | First embodiment | Second embodiment | Third embodiment |
|---|---|---|---|
| $15 < \dfrac{f_t}{f_w} < 30$ | 18.0952 | 18.0952 | 18.0952 |
| $\dfrac{TL}{f_t/f_w} < 8$ | 7.4605 | 7.4605 | 7.4605 |
| $2.5 < \dfrac{f_1}{f_4} < 3.0$ | 2.79 | 2.73 | 2.78 |
| $1.5 < Vd_{12}/Vd_{11} < 2.5$ | 1.91 | 1.91 | 1.91 |
| $30 < Vd_{32} < 38$ | 37.28 | 37.28 | 37.28 |

As described above, the exemplary embodiments provide six-group zoom lens systems having high magnification and guaranteeing high-resolution photographing at night as well as in the daytime by correcting chromatic aberration in a range from a visible ray to an NIR ray. In addition, zoom lens systems of which aberration is corrected in a peripheral region as well as in a center region of a screen may be provided.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments including the above exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A zoom lens system comprising:
a first lens group having a positive refractive power;
a second lens group having a negative refractive power;
a third lens group having a positive refractive power;
a fourth lens group having a positive refractive power;
a fifth lens group having a positive refractive power; and
a sixth lens group having a positive refractive power,
wherein the first to sixth lens groups are sequentially arranged along an optical axis from an object side to an image plane side, and zooming is performed by moving at least one of the second lens group, the fourth lens group and the fifth lens group along the optical axis,
wherein a distance between a focal point of light having a first wavelength and a focal point of light having a second wavelength is about 50 μm or less at a wide-angle position and a telephoto position,
wherein the first wavelength corresponds to green light, the second wavelength corresponds to near infrared (NIR) light,
wherein the third lens group comprises a positive lens and a negative lens sequentially arranged from the object side, and at least one surface of the negative lens is aspherical, and
wherein an Abbe number of the positive lens of the third lens group is less than an Abbe number of the negative lens of the third lens group.

2. The zoom lens system of claim 1, wherein the first wavelength is about 546 nm, and the second wavelength is about 850 nm.

3. The zoom lens system of claim 1, wherein the distance between the focal point of light having the first wavelength and the focal point of light having the second wavelength is about 30 μm or less at the wide-angle position.

4. The zoom lens system of claim 1, wherein the zoom lens system satisfies a following condition:

$$15 < \frac{f_t}{f_w} < 30,$$

where $f_w$ is a focal length at the wide-angle position, and $f_t$ is a focal length at the telephoto position.

5. The zoom lens system of claim 4, wherein the zoom lens system satisfies a following condition:

$$\frac{TL}{f_t/f_w} < 8,$$

where TL is a distance between an image plane to an object-side surface of one of lenses of the first lens group that is closest to the object side.

6. The zoom lens system of claim 1, further comprising an aperture stop between the third lens group and the fourth lens group.

7. The zoom lens system of claim 1, wherein the first lens group, the third lens group, and the sixth lens group are fixed during zooming.

8. The zoom lens system of claim 1, wherein the zoom lens system satisfies a following condition:

$$2.5 < \frac{f_1}{f_4} < 3.0,$$

where $f_1$ is a focal length of the first lens group, and $f_4$ is a focal length of the fourth lens group.

9. The zoom lens system of claim 1, wherein the first lens group comprises a doublet lens at a position closest to the object side, the doublet lens comprising a negative lens and a positive lens sequentially arranged from the object side, and
wherein the zoom lens system satisfies a following condition:

$$1.5 < Vd_{12}/Vd_{11} < 2.5,$$

where $Vd_{11}$ is an Abbe number of the negative lens of the doublet lens, and $Vd_{12}$ is an Abbe number of the positive lens of the doublet lens.

10. The zoom lens system of claim 1, wherein the zoom lens system satisfies a following condition:

$$30 < Vd32 < 38$$

where Vd32 is an Abbe number of the negative lens of the third lens group.

11. The zoom lens system of claim 1, wherein each of the second lens group, the third lens group, the fourth lens group comprises at least one lens having an aspherical surface.

12. The zoom lens system of claim 1, wherein the zoom lens system comprises at least five lenses each having a refractive index of about 2.0 or greater.

13. The zoom lens system of claim 1, wherein the sixth lens group comprises a triplet lens comprising three lenses cemented together.

14. The zoom lens system of claim 1, wherein the first lens group comprises at least four lenses each having an Abbe number of about 95 or greater.

15. A zoom lens system comprising:
a first lens group having a positive refractive power;
a second lens group having a negative refractive power;
a third lens group having a positive refractive power;
a fourth lens group having a positive refractive power;
a fifth lens group having a positive refractive power; and
a sixth lens group having a positive refractive power,
wherein the first to sixth lens groups are sequentially arranged along an optical axis from an object side to an image plane side, and zooming is performed by moving at least one of the second lens group, the fourth lens group and the fifth lens group along the optical axis, and
wherein a distance measured in a direction parallel to the optical axis between a focal point of light having a wavelength of about 546 nm and a focal point of light having a wavelength of about 850 nm is about 30 μm or less,
wherein the zoom lens system satisfies a following condition:

$$15 < \frac{f_t}{f_w} < 30,$$

where $f_w$ is a focal length at a wide-angle position, and $f_t$ is a focal length at a telephoto position,
wherein the first lens group comprises at least four lenses each having an Abbe number of about 95 or greater,
wherein the third lens group comprises a positive lens and a negative lens sequentially arranged from the object side, and at least one surface of the negative lens is aspherical, and
wherein an Abbe number of the positive lens of the third lens group is less than an Abbe number of the negative lens of the third lens group.

16. The zoom lens system of claim 15, wherein the zoom lens system satisfies a following condition:

$$30 < Vd32 < 38,$$

where Vd32 is an Abbe number of the negative lens of the third lens group.

* * * * *